United States Patent [19]

Minter

[11] Patent Number: 4,903,139
[45] Date of Patent: Feb. 20, 1990

[54] IMAGE GENERATING SYSTEM FOR DUPLEX PRINTING

[75] Inventor: Charles Minter, Boulder, Colo.

[73] Assignee: Kentek Information Systems Inc., Allendale, N.J.

[21] Appl. No.: 116,363

[22] Filed: Nov. 2, 1987

[51] Int. Cl.⁴ .............................................. H04N 1/21
[52] U.S. Cl. ..................................... 358/296; 358/470
[58] Field of Search ............... 358/285, 263, 296, 298, 358/300, 302; 364/519; 340/750; 355/23, 24

[56] References Cited

U.S. PATENT DOCUMENTS

| | | | |
|---|---|---|---|
| 4,419,007 | 12/1983 | Kingsley | 355/23 |
| 4,499,500 | 2/1985 | Nagashima. | |
| 4,505,576 | 3/1985 | Sugiura et al. | |
| 4,664,507 | 5/1987 | Fukae et al. | |
| 4,677,571 | 6/1987 | Riseman et al. | 358/263 |
| 4,758,862 | 7/1988 | Fukae et al. | |

FOREIGN PATENT DOCUMENTS

0179292A2 4/1986 European Pat. Off.
0220443A2 5/1987 European Pat. Off.

OTHER PUBLICATIONS

Sproull, Robert F. et al., "The 8 by 8 Display", ACM Transaction on Graphics, vol. 2, No. 1, pp. 32-56 (1983).

*Primary Examiner*—C. L. Albritton
*Assistant Examiner*—Lincoln Donovan
*Attorney, Agent, or Firm*—Marmorek, Guttman & Rubenstein

[57] ABSTRACT

An image generation system includes a data processor for carrying out data processing operations along with a read only memory (ROM) and random access memory (RAM). A bus bar interconnects the various units to establish a flow of commands and data. A floppy disk controller operates as an interface for a floppy disk drive and a direct memory access controller controls the floppy disk controller for the transfer of data to the RAM. A serial communication controller serves as an interface between the flow of data from the image generation system to a printer engine. A bit-map means operates for storing, addressing and re-organizing data for normal and duplex printing.

1 Claim, 6 Drawing Sheets

IMAGE GENERATING SYSTEM FOR DUPLEX PRINTING

BACKGROUND OF THE INVENTION

This invention relates to an image generation system for use in an electrographic printer or copying machine capable of duplex printing, printing on both sides of a sheet of paper. More specifically, the present invention relates to an image generation system which can accept a description of the text and graphics to appear on the paper from a host computer system and compute the bit pattern in the bit-map RAM corresponding to the desired image.

In the process of electrographic or xerographic printing, a photoconductive member is employed to record an image. The photoconductive member, which may be in the form of a belt or a drum, is charged to a substantially uniform potential to sensitize its photosensitive surface. In the case of a copying machine, a light is projected on to an original document to be copied. Through the use of lenses, mirrors, and various other optical components, the charged portion of the photoconductive surface is exposed to a reflected light image of an original document to be reproduced. The light image is recorded as an electrostatic latent image on the photoconductive member. This latent image corresponds to the informational areas contained on the original document.

In the case of an electrographic printer connected to a computer, a similar process is used to record information on the photoconductive member. The charged portion of the photoconductive surface is exposed to a light image produced by an optical print head. The precise shape of the light image is controlled by input signals from the computer. For example, a laser or an LED array may be used as an optical print head which receives input signals from the computer to illuminate the photoconductive member with a light image of a particular shape. Here too, an electrostatic latent image corresponding to the desired informational areas is recorded on the photoconductive member. The control of the LED array determines not only what is printed but whether the printing is from top to bottom or bottom to top, or any other predetermined pattern.

As used herein, the term "electrographic printing apparatus" and the like refer to both electrographic printers and copiers. As used herein, the term "printing engine" refers to the apparatus for printing on paper.

After recording the electrostatic latent image on the photoconductive member, the latent image is developed by bringing a developer material or toner into contact with it. The developer material is attracted to the electrostatic latent image and forms a powder image on the photoconductive member corresponding to the electrostatic latent image. The powder image is subsequently transferred to a sheet of recording medium, such as a sheet of paper, in a transfer region. Thereafter, the powder image is permanently affixed to this sheet in image configuration by a variety of methods, such as by fusing.

The above-mentioned operations may be carried out by arranging a number of stations in sequence about the photoconductive member. Thus, the photoconductive member is usually surrounded in sequence by a charging station to charge the photoconductive member, an imaging station to form an electrostatic latent image on the photoconductive member, a developing station to develop the electrostatic latent image on the photoconductive member, and a transfer station to transfer the developed image from this photoconductive member to the sheet of recording medium. A discharging station and a cleaning station are also arranged about the photoconductive member to ready it for use again.

An example of such an electrographic printing apparatus is disclosed in allowed application Ser. No. 700,813, filed Feb. 11, 1985, now U.S. Pat. No. 4,664,507. The electrographic printing apparatus described in that patent appplication employs a photoconductive belt assembly in the form of a disposable cassette which is the subject of allowed application Ser. No. 718,947, filed Apr. 2, 1985, now U.S. Pat. No. 4,657,369. The electrographic printing apparatus described in application Ser. No. 700,813 also employs the combined developing and cleaning unit which is the subject of allowed application Ser. No. 718,946, filed Apr. 2, 1985, now U.S. Pat. No. 4,639,116. All of the aforementioned patent applications are assigned to the present assignee and all are incorporated herein by reference.

The electrographic printing apparatus described in application Ser. No. 700,813 has a simplified paper path permitting access from the top of the machine. In that electrographic printing apparatus, the cassette containing the photoconductive belt is mounted vertically within the machine and a latent image is developed on the underside of the copy sheet as it passes over and comes in contact with the top of the photoconductive belt assembly.

The electrographic printing apparatus described in that application requires two rotations of the photoconductive belt per copy produced. In actual practice, it is capable of producing about 12 copies per minute. During the first rotation of the photoconductive belt, the belt is uniformly charged and a latent image is generated by means of an optical print head on the surface of the photoconductive belt. The latent image thus formed is developed by the deposition of toner from a combined developer/cleaning unit operating in the develop mode. The belt then enters the transfer region wherein the developed image is transferred to the underside of the paper or other copy material. In the transfer region, a transfer unit generates an electrical field which attracts the toner from the photoconductive belt to the underside of the paper. This completes the first rotation of the belt as the paper travels to a fuser unit and is discharged into the output tray.

During the next revolution of the belt, the belt is prepared for making the next copy. The main charging unit and the optical print head are disabled while an erase lamp is activated and the developer/cleaner unit is switched to the clean mode. Thus, as the belt continues to rotate following image transfer, the photoconductive belt is discharged by an erase lamp and the excess toner is removed using a conventional electrostatic process by the developer/cleaner unit. The belt is thereby readied for printing on the next page.

The electrographic printing apparatus described in application Ser. No. 700,813 is to provide a machine which reliable over an extended period of use and which is easily serviceable. To accomplish this, the machine is provided with modular units which are easily removed and replaced at specified time intervals or when they malfunction. In addition, the machine is provided with a simplified paper path whereby the paper always travels along a substantially planar path located near the top of the machine. The paper is imprinted on its underside as it travels along this paper path and passes across the top of the vertically mounted photoconductive belt.

By providing this "straight-through" paper path, the number of paper jams is considerably reduced. In the event a paper jam does occur, the lid of the machine can be opened and the jammed paper can be readily accessed from the top of the machine. This is in contrast to prior art machines wherein paper jams can only be accessed from the side of the machine. Additionally, because the paper is imprinted on its underside, and because the machine has a "straight-through" paper path, the paper is ejected into the output tray face down. Thus, the paper is automatically collated as it is being printed and ejected.

The electrographic printing apparatus disclosed in application Ser. No. 700,813 does not perform duplex printing, i.e., the ability to print on both sides of a sheet of paper. Duplex printing is important in many applications, for example, in printing a book or in so-called "desktop publishing" applications.

Duplex printing utilizes an image generation system which can print one side of a paper in one direction and the other side in the opposite direction in order to simplify the mechanical handling of the paper in turning it over.

The image generation system in the application Ser. No. 700,813 does not include the capability of printing in opposite directions.

In addition, the prior art image generation system (IGS) is limited to a print head of 240 dots per inch (dpi) and uses 1 MB of bit-map RAM to build an 8½ inch/by 14 inch paper at 240 dpi.

There is a need for a high speed duplex printer which can operate with 240 dpi and higher dot densities.

SUMMARY OF THE INVENTION

The present invention relates to an image generation system which enables a print engine to carry out duplex printing. In addition, the instant generation system provides a resolution greater than 240 dots per inch. In another embodiment, the image generation system includes a selectable resolution including at least about 400 dots per inch.

The image generation system according to invention operates to control a print machine. The image generation system includes a data bus for the full of data between various components. A processing means such as used in a microprocessor operates to carry out data processing operations and is coupled to the data bus. A read only memory (ROM) is associated with the processing means for storing programs. These programs can include a bootstrap program along with diagnostic programs. A collection of random access memories (RAM's) are coupled to the processing means and operate for storing data which can be randomly accessed. Such data is used in carrying out operations.

A floppy disk can be used in connection with the image generation system. A floppy disk controller forms a part of the IGS and is coupled to the data bus. The floppy disk controller operates as an interface with a floppy disk drive and controls the transfer and receiving of data. A direct memory access controller operates to control the floppy disk controller for transferring data between the floppy disk control and the RAM's.

A serial communication controller operates for controlling the flow of data from the image generation system to a printer engine. It is the bit-map means which operates to store, address and reorganize data for normal and duplex printing. The bit-map means preferably provides a resolution greater than 240 dots per inch and is preferably selectable. A resolution of up to 400 dots per inch is desirable.

These and other objects are achieved by means of the present invention which provides an image generation system for an electrographic printing apparatus for producing hard copies of information to be recorded on two sides of a sheet of paper or other copy material.

DETAILED DESCRIPTION OF THE PREFERRED EMBODIMENT

Figure 1:
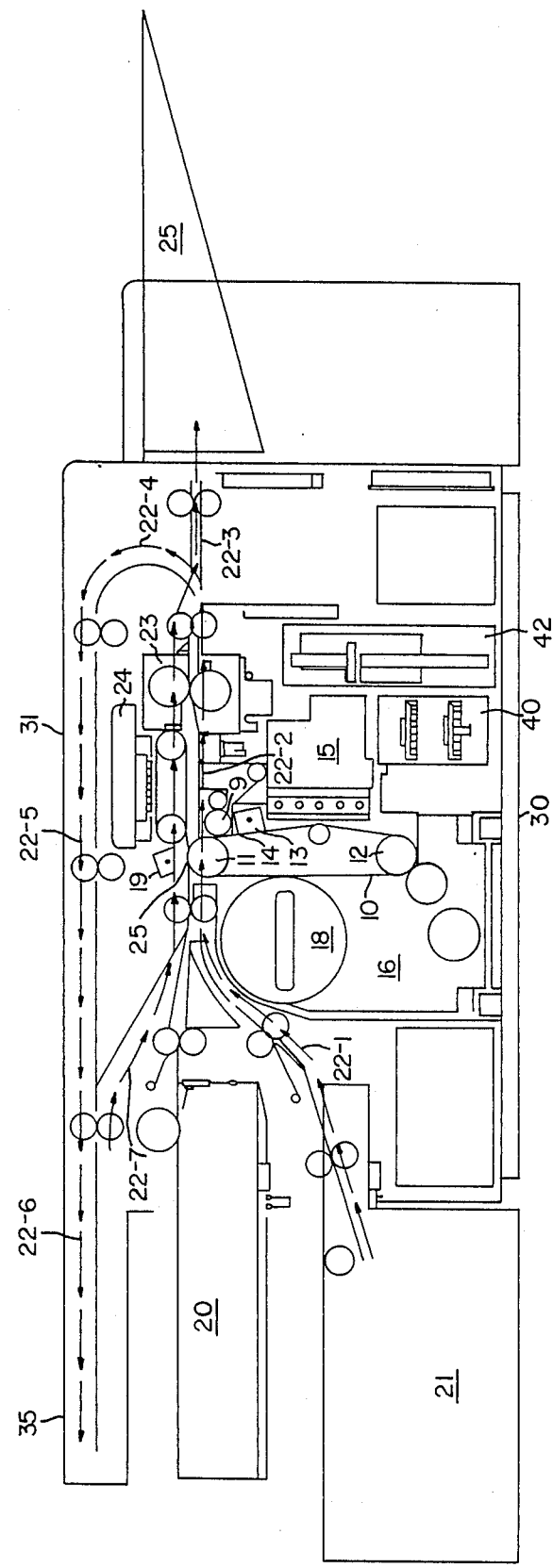
FIG. 1 is a schematic diagram of an electrographic printer suitable for the image generation system in accordance with an the present invention.

FIG. 1 is a block diagram showing the basic components of an electrophotographic printer in accordance with one aspect of the present invention. Such printers typically include a photoconductive member which, in the illustrative embodiment, is photoconductive belt 10. Preferably, the photoconductive member comprises the photoconductive belt assembly in the form of a disposable cassette which is disclosed and claimed in the previously mentioned allowed application Ser. No. 718,947, filed Apr. 2, 1985. As illustrated in FIG. 1, this photoconductive belt assembly is mounted vertically in the electrographic printer. It includes a sheet guiding structure (not shown) at the top of its frame which guides the sheet across its top. The sheet guiding structure defines a horizontal transfer zone 25 of short length below the top of the housing 30 of the printer. Housing 30 includes a top lid 31 which is hinged so that it can be lifted upwardly.

The photoconductive belt rotates clockwise as shown by means of rollers 11 and 12. Located along the right side of the belt, as viewed in FIG. 1, are a cleaning unit 9, erase lamps 14, a main charger 13, and an optical print head 15. On the left side of the belt is the developer unit 16. This unit contains a toner cartridge 18 for convenient handling. Located at the top of the belt path, is a transfer unit 19, which unit creates an electric field to attract toner from the photoconductive belt 10 onto the underside of sheets of paper or other copy material passing through the image transfer region 25. The copy material travels along a paper path which is generally designated with the number 22. As it travels along this paper path, the copy material passes through transfer region 25 where it is imprinted from below.

The paper path of the illustrated printer will now be described by reference to the arrows shown in FIG. 1.

The copy material, e.g., paper, is derived from either of two convenient paper handling cassettes 20 or 21. For purposes of explanation, it will be assumed that a sheet of paper with a first side "A" facing down and a second side "B" facing up is supplied by the lower cassette 21 by means of suitable rollers. The paper is first directed along a branch 22-1 of the paper path until it enters a first main portion 22-2 of the paper path, as shown by the lower set of arrows in FIG. 1. Portion 22-2 of the paper path leads the sheet of paper into contact with photoconductive belt 10 in image transfer region 25 located between the upper roller 11 and the transfer unit 19. While the sheet of paper is in transfer region 25, it is imprinted from below onto its underside, in this case side A. From the image transfer region 25, the paper is transported along portion 22-2 of the paper path 22 to a fuser unit 23 by means of a vacuum transport unit 24. In the event duplex printing has not been selected, the paper continues along a branch 22-3 of the paper path and is ejected into output tray assembly 25 with its printed side, side A, face down, thus being automatically collated.

Thus far, the description of the present invention is similar to that for the electrographic printing apparatus described in application Ser. No. 700,813. In the event duplex printing is selected, the sheet of paper is not ejected into output tray 25 after it passes through fuser unit 23. Rather, the paper enters an area of reversion 22-4 of paper path 22 where it is turned over so that side B now becomes the underside. The paper then enters second main portion 22-5 of paper path 22. This second main portion 22-5 of the paper path is located immediately below lid 31 of the printer. Being located in such close proximity to lid 31 permits easy access to the sheet of paper as it travels along the paper path in the event of a paper jam.

The sheet of paper next enters a branch 22-6 of paper path 22 where a paper skew correction device 35 is mounted on lid 31. Paper skew correction device 35 mechanically realigns the paper horizontally so that when it is imprinted on its second side, side B, all of the margins will be properly aligned to coordinate with the printing on side A.

After being realigned by paper skew correction device 35, the paper returns to the first main portion 22-2 of paper path 22 via a reversion portion 22-7. This time the sheet travels along portion 22-2 with its second side, side B, as its underside. The paper enters transfer region 25 once again and information is printed on side B of the sheet of paper as it makes contact with the photoconductive belt 10. Next, the printed paper is transported to fuser unit 23 by means of vacuum transfer unit 24 whose only contact now is with side A, the already imprinted and fused side of the paper. The unfused side, side B, does not come in contact with transfer unit 24 thus avoiding smudging on that side of the paper. The fuser unit 23 then fuses the toner onto side B of the paper by applying heat to the paper and the paper is ejected into output tray 25 with side B facing down. Since all of the imprinted paper is received with side B facing down, the paper is automatically collated as it is collected in output tray 25.

As the sheet of paper travels along straight portion 22-2 of the paper path, it travels with a leading edge, for example, the top of the sheet, in front. As the sheet passes through reversionary area 22-4 and enters straight portion 22-5 of the paper path, the sheet is turned over, so that side B becomes the underside. During this portion of the paper path, the sheet is still travelling with the same leading edge in front. It then enters branch 22-6, leading edge first, for realignment. When the sheet leaves branch 22-6 in order to re-enter portion 22-2 of the paper path, however, it does so with its trailing edge, i.e., its bottom edge, in front and with side B as its underside. In other words, the sheet of paper "backs out" of branch 22-6. As a result, of this backing out operation, the sheet is not turned over once again when it travels from portion 22-5 of the paper path back into portion 22-2. Side B which is the underside of the sheet as it travels along portion 22-5 of the paper path, remains the underside when it re-enters portion 22-2 of the paper path.

Summarizing, in the event duplex printing is not selected, the paper path may be described as follows:

$$21 \rightarrow 22\text{-}1 \rightarrow 22\text{-}2 \rightarrow 22\text{-}3 \rightarrow 25$$

with the paper being imprinted from below on Side A. In the event duplex printing is selected, the paper path is as follows:

$$21 \rightarrow 22\text{-}1 \rightarrow 22\text{-}2 \rightarrow 22\text{-}4 \rightarrow 22\text{-}5 \rightarrow 22\text{-}6 \rightarrow 22\text{-}7 \rightarrow 22\text{-}2 \rightarrow 22\text{-}3 \rightarrow 25$$

with a "backing-out" operation occurring between portions 22-6 and 22-7 of the paper path, and with the paper being imprinted on both sides A and B.

It will be observed from this description, that the paper path schematically comprises a loop (22-2, 22-4, 22-5, and 22-7) with a number of branches (22-1, 22-3, and 22-6) extending from the loop. In particular, for duplex printing to take place, it is important that the paper follow a path comprising the loop 22-2, 22-4, 22-5, and 22-7, with a stop at the branch 22-6 for a backing out operation.

The operation of this printer involves only a single rotation of belt 10 per side imprinted. During this rotation, the belt is uniformly charged as it passes main charger 13. A latent image is generated by means of optical print head 15, which can be either a laser or an LED array. The optical print head serves to discharge selected portions of the uniformly charged photoconductive belt 10 as it moves past the optical print head. The latent image thus formed is then developed by the deposition of toner particles from the developer unit 16. Illustratively, the toner is deposited only on the discharged portions of the photoconductive belt 10. The belt then enters the transfer region 25 wherein the developed image is transferred to the underside, which is either side A or side B, of the paper. In the transfer region 25, the transfer unit 19 serves to form an electric field which attracts the toner from the photoconductive belt 10 to the underside of the paper.

Having transferred the developed image to the underside of the paper, the photoconductive belt 10 must then be readied for imprinting the next copy or the other side of the sheet of paper if duplex printing has been selected by the operator. The photoconductive belt 10, continuing in the same revolution, is first cleaned by means of cleaning unit 9. The erase lamps 14 are then activated to uniformly discharge the photoconductive belt. Thus, as the belt rotates following image transfer, the excess toner is removed by the cleaning unit 9 and the belt is discharged by erase lamps 14. The belt is thereby readied to be charged again by main charger 13 for imprinting of the next copy or the other side of the sheet of paper.

In the instant process, the copy is always formed along the underside of the paper as it travels along paper path 22 through the transfer zone 25. This is accomplished by locating the photoconductive belt 10 below the straight portion 22-2 of the paper path. In FIG. 1, the transfer region 25 is located above roller 11 and the paper enters the region with its lower surface in contact with belt 10.

To avoid smudging the copy following image transfer, the printed paper is transported to the conventional fuser unit 23 by means of a vacuum transfer unit 24 whose only contact is with the upper side of the paper. This side either has no toner on it, or has already fused toner on it. The fuser unit 23 serves to fuse the toner to the underside paper by way of applying heat to the paper.

The cleaning unit 9 may comprise any of a number of conventional devices which have been used to remove residual toner particles from photoconductive members. Cleaning unit 9 may comprise, for example, a cleaning brush or a scraper blade. Preferably, cleaning unit 9 comprises an electrostatically charged cleaning device. Such devices are maintained at a suitable biasing voltage as a result of which they are able to attract toner particles from the photoconductive member. In FIG. 1, cleaning unit 9 comprises the fur brush, roller, and scraper blade combination described in one of the aforementioned co-pending applications.

As a result of the use of a separate and independent cleaning unit, the electrographic printer described herein comprises a "one-pass" rather than a "two-pass" machine, i.e., one side of the sheet of paper is imprinted per revolution of the photoconductive belt. Thus, the output of the machine is effectively twice that of the electrographic printer disclosed in application Ser. No. 700,813. In actual practice, the electrographic printer described herein is capable of printing 24 sides per minute vs. 12 sheets per minute for the printer described in application Ser. No. 700,813.

The electrographic printer illustrated in FIG. 1 utilizes an image generation system (IGS) which controls and coordinates each of the operations of its various components. The IGS receives a variety of signals from various sensors and command stations associated with the printer and sends out a variety of signals in response thereto. The IGS receives signals from various sensors to detect malfunctions in the printer and sends out signals to alert the operator to these malfunctions. The IGS also interfaces with a computer terminal diskette drive 40 and hard disk drive 42, to control operation of the print head 15.

The IGS controls all of the operations of the printer such as the timing of the various components of the printer. It also detects when the operator has selected duplex printing and directs the paper transport mechanism to pass the sheet of paper into the duplex printing path.

Another important function of the IGS is to reformat the light image projected by optical print head 15 onto photoconductive belt 10 when imprinting on the second side of the sheet of paper is about to occur. As described above, the sheet of paper passes through portion 22-2 of the paper path the first time with a leading edge in front. However, when the sheet of paper passes through portion 22-2 the second time for printing on its second side, it does so with its trailing edge in front. This is because of the "backing out" operation which occurs when the paper reenters the loop after stopping in branch 22-6. Unless the light image is reformatted by the IGS, the printing on the second side of the sheet of paper will be reversed from that on the first side.

Assuming, for example, that the leading edge is the top of the sheet of paper which passes through transfer region 25 the first time, printing will occur from top to bottom on the sheet of paper. When the sheet of paper passes through transfer region 25 the next time for imprinting on its second side, it passes through with its bottom edge first. Thus, in order for information to be printed properly on the second side of the paper, the light image from optical print head 15 must be reformatted from bottom to top. This is accomplished by means of the IGS when the IGS detects that the duplex printing feature has been selected.

Figure 2:
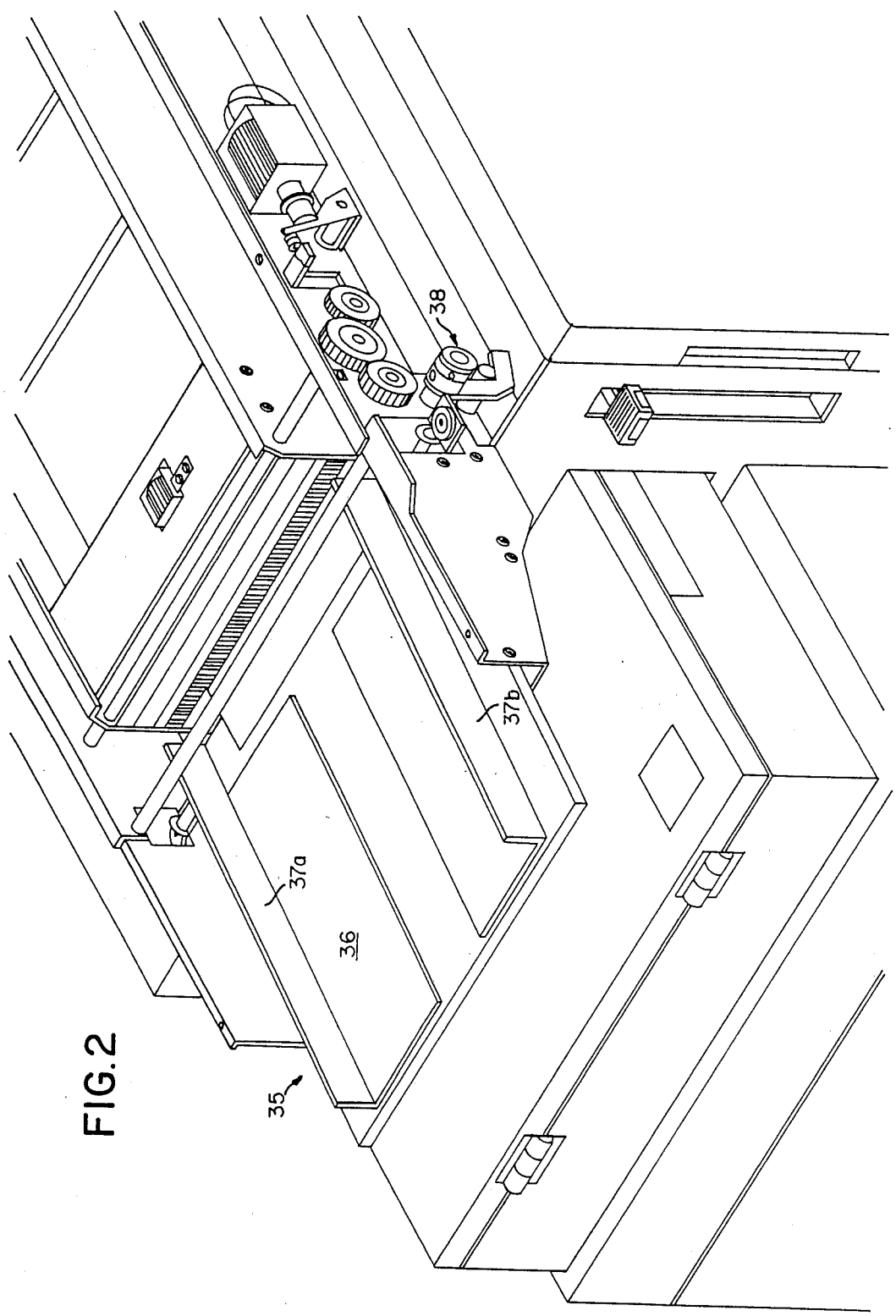
FIG. 2 is a perspective view of a portion of an electrographic printer incorporating the image generation system according to the present invention.

Referring not to FIG. 2, a paper skew correcting 35 is shown mounted on an electrographic printing apparatus of the present invention. Paper skew correcting device 35 comprises a bed 36 for receiving the paper and guide plates 37a and 37b. The guide plates 37a and 37b realign the paper when it is ejected onto bed 36. A gearing system 38 is also provided by means of which the distance between guide plates 37a and 37b are adjusted. Gearing system 38 is controlled by the IGS which adjusts the distance between the guide plates in response to formatting signals received by the computer. Alternatively, the IGS may be interfaced with the input paper trays which have sensors to detect the width of the paper loaded into the trays. An example of such an input paper tray is described in application Ser. No. 718,945, filed Apr. 2, 1985, which is assigned to the present assignee and is incorporated herein by reference. The IGS adjusts the distance between guide plates 37a and 37b in response to signals received from these sensors.

In addition, the IGS controls the paper rollers inside the electrographic printer to carry out the desired "backing-out" operation when the paper visits paper skew correcting device 35. Thus, the IGS acts to ensure that the paper rollers turn in one direction to eject the paper onto bed 36 of paper skew correcting device 35, and then acts to reverse the rotational direction of the paper rollers so that the backing-out operation is performed.

Figure 3:
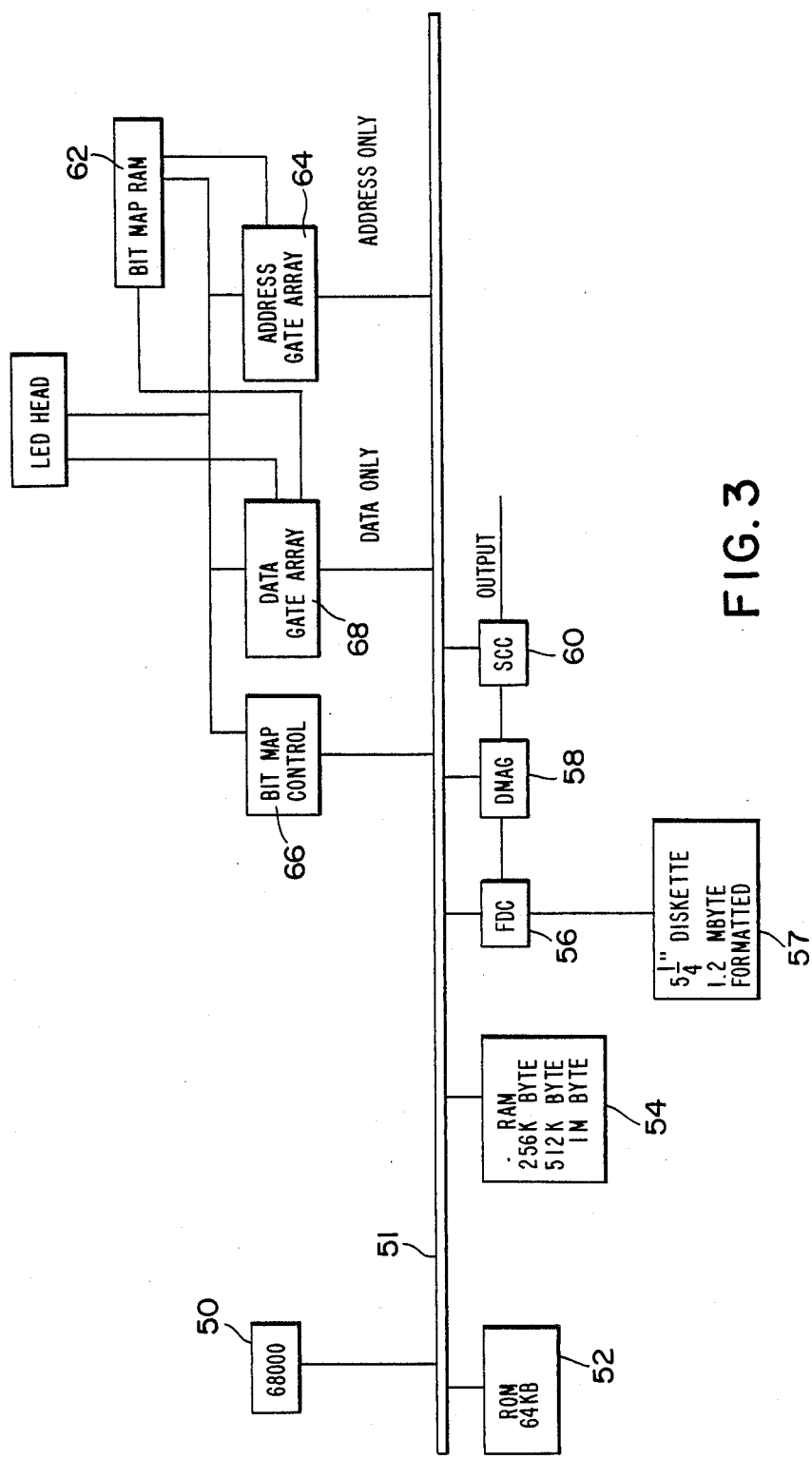
FIG. 3 is a block diagram of the image generation system according to the invention.

FIG. 3 shows a block diagram of an image generation system according to the invention. The IGS is the interface between a host computer system (not shown) and a print engine (not shown). Generally, a piece of paper for printing is logically divided into a larger number of small regions by a fine grid produced by a set of vertical and horizontal lines. In prior art operations, there were 240 vertical and horizontal lines per inch producing 240 dot density. The present system extends the capability of the IGS so that 240, 300, and 400 dot densities can be selectably carried out. This is accomplished by the use of the instant bit-map RAM.

Broadly, the IGS accepts a description of the text and graphics to appear on a paper from a host computer system and computes the bit pattern and the bit-map RAM corresponding to the desired image. The IGS transfers the contents of the bit-map RAM to the writing circuitry so that the production of the desired images occurs. In the prior art, the image is always transferred beginning at the top of the image and transferring each horizontal line of the image from left to right until the entire image has been transferred. Each horizontal line of the image is called a scan line.

For duplex printing, the transfer of the image cannot be limited to a process which starts at the top image if a relatively simple print engine is used. Accordingly, the instant IGS can transfer an image either by starting at the top of the image or the bottom of the image as required. Furthermore, the instant IGS can be operated to transfer an image starting from an intermediate position between the top and bottom of the image if desired.

Generally, the instant IGS includes a computer processing unit (CPU) including a processing chip such as a commercially available 68000 chip, an EPROM memory, a RAM memory and its support logic, serial communication logic, direct memory access (DMA) logic, and an interface arrangement.

The 68000 processor transforms document-level protocol received from the communication logic into an intermediate form and transforms this into an image in a bit-map memory.

The logic is designed to use a 10 MHz processor rather than the prior art MHz processor. The components of the system should be compatible with the operating speed. For example, the CPU RAM's (not the bit-map RAM's) should operate with 120 ns access time rather than 150 ns access time used in the 8 MHz system.

Generally, support logic for the 68000 chip includes six sub-units: processor clock, reset circuitry, timer circuitry, interrupt circuitry, address decoding circuitry and timeout circuitry. Such sub-units are known in the prior art and will be described briefly herein.

The clock for the processor and other clock circuitry is derived from a crystal oscillator. The frequency of the oscillator is 20 MHz. This frequency is divided by two by a 74F74 D-type flip-flop with the Q-bar output connected to the input. The division is used because the 68000 chip requires a fifty percent duty cycle clock and the output of crystal oscillators generally varies between forty percent and sixty percent duty cycle. The flip-flop is an F or S type chip so that there are symmetrical delays for the high-going and low-going output.

The reset circuitry operates in connection with the RESET and HALT signals of the 68000 chip. These signals are asserted for a few hundred milliseconds when power is applied to the IGS. After that time, the signals are removed and 68000 chip begins to execute instructions by fetching its reset vector from location zero. The signals are generated by a simple RC circuit connected to a 74LS14 inverter with Schmidt trigger input. The output of the inverter is inverted to produce a low signal. The output of this inverter is ORed with the output timer circuit. The combined signal is then passed through two open-collector drivers. Both HALT and RESET are inputs to and outputs from the 68000 chip. If the 68000 chip stops, it will assert the HALT signal. If the 68000 chip executes a reset instruction, it will assert the reset signal. The HALT signal is not used elsewhere and it is provided to initialize the 68000 chip when the power is turned on. The RESET signal is passed through a non-inverting buffer for use in resetting the remainder of the logic in the system. This allows the logic in the system to be reset when the power is turned on when the 68000 chip executes a reset instruction.

The timer circuitry operates to reset the 68000 chip if it appears that the processor is no longer running correctly. The timer circuitry is disabled when power is turned on. During normal operations, the 68000 chip produces the signal for disabling the timer circuitry. A change in the 68000 chip produces a change in the signal controlling timer circuitry thereby enabling the timer circuitry. If a predetermined time such as a half a second passes while the timer circuitry is enabled and an appropriate signal from the 68000 chip is not issued, a reset signal is directed to the 68000 chip. This reset signal also sets a flip-flop so that the 68000 chip can determine that a reset was due to the timer circuitry or power being turned on. The interrupt circuitry can use a 74LS148 priority encoder chip coupled to the 68000 chip.

The interrupt circuitry interrupts the 68000 chip for various predetermined conditions. Typically, the priority of the interrupt levels are given in table one. Following the 68000 chip convention, the higher the number of the priority level, the higher the priority.

TABLE One

| LEVEL | DEVICE |
|---|---|
| 7 | none |
| 6 | General Communication Controllers |
| 5 | General Purpose Timer |
| 4 | General Purpose parallel Interrupt Input (PITO) (Including floppy disk interface interrupt request) |
| 3 | unassigned |
| 2 | General Purpose Parallel Interrupt Input (PIT2) (Including beginning of page interrupt and end of page interrupt) |
| 1 | Direct Memory Access Controller |
| 0 | not applicable |

The address decoding circuitry is carried out in two levels by a PAL circuit and a 74LS138 one-of-eight decoder. The PAL circuit decodes information from the EPROM memory, RAM memory, the bit-map RAM, miscellaneous devices and the DMA controller. In addition to the decoding logic, there is another PAL circuit which provides timing information for producing the write enable signal for the floppy disk controller and a signal that is ANDed with a signal from the 68000 chip to produce the read enable signal.

When the 68000 chip is first powered up, it reads the initial value of the program counter and stack pointer beginning at location zero. The interrupt vectors are automatically fetched from the memory. The reset vectors are stored in some form of non-volatile memory while the interrupt vectors are stored in a RAM. To accomplish this, the address decodes circuitry allows either the EPROM or the RAM to be located at location zero. During the initial power-up or a reset, the RAM is accessible at address zero. For convenience in switching between these two states, the EPROM can be referenced at another address. The initial program counter in the reset vector located at location zero of the EPROM points to a program in the EPROM at the permanent address of the EPROM.

The timeout circuitry generates a signal to indicate the completion of a memory of the 68000 chip in the event that such a signal is not produced by other circuitry within a present time period. Typically, the timeout circuitry will wait about eight microseconds after the beginning of a memory cycle to produce its signal. This circuitry makes it possible to detect errors in the operation of the 68000 system at an early stage.

The EPROM memory can include two 2764 EPROM's or two 27128 EPROM's. Generally, the purpose of this memory is to store diagnostic programs that are executed when the printer is powered on and to store the bootstrap that reads in the programs to be used during the normal operations of the printer from the floppy disk drive or from the host communication line.

Two EPROM chips are used for the EPROM memory because the data bus of the 68000 chip is sixteen bits wide and the EPROM data width is eight bits.

The RAM can have different sizes such as 128 Kb, 256 Kb, 512 Kb, or 1 Mb. The smallest of these sizes is too small to accommodate the program's data and fonts used to operate the desired printer adequately. One of the most important chips in the control of the RAM's is the 2964B dynamic RAM controller chip. This chip provides the bank decoder, address multiplexer, refresh counter and some timing and control logic. The detailed timing is controlled by a delay line. A signal is fed to the delay line when a 68000 memory cycle commences.

The 2964B chip also generates an eight-bit refresh signal. The timing for the refresh cycle is divided by ten so that it will be 1 MHz signal for the 10 MHz processor. Memory refresh is the highest priority request.

Typically, the serial communication controllers can be two Zilog 8030 chips. These commercially available chips are very sophisticated LSI components designed to be part of a Z8000 processor. Each of these chips contains independent logic for two communications channels. The operations of these chips are well know in the art.

Only two of the four serial communications channels are used during the normal operation of the printer. One is used for a serial link to the printer control or electronics and the other is used for an optional connection to a host computer system or the communication logic. Ordinarily the only external device connected to the second communications channel would be a personal computer (PC). It is possible for other host computer systems to communicate directly using this port. The remaining two serial channels are available for diagnostic purposes.

Generally, the Z8000 family components multiplex both address and data over the same pins to minimize the package size. The logic necessary to connect the Zilog 8030's to the bus of the 68000 chip is used to multiplex separate 68000 address and data to the sheared pins of the 8030 chips. This logic is controlled by a registered PAL. When the PAL receives a signal that indicates that either the 68000 chip is trying read or write registers on one of the 8030 chips or that an interrupt acknowledge has been issued to one of them, it begins to access cycle to the 8030 chips. In the quiescent state, the address lines of the 68000 chip are driven onto the address/data pins of the serial communications controller chips. The PAL begins the cycle by asserting an address strobe signal to the serial communication controller. The low-order five address bits of the 68000 chip are latched by the serial communication controller chips at this time. These bits are used to select which register on the serial communication controller chips will be referenced.

In addition, address bit 6 from the 68000 chip is latched and used by chip select logic internal to the serial communication controller chips to determine which of the two chips is being referenced. The asserted version of the address bit is wired to one of the serial communication controller channels and the complement of the bit is wired to the other serial communication controller channel. After the PAL has allowed enough time for the address latch, it disables the address buffers and enables the data transceivers. After an initial setup time, it then asserts the strobe signal to the serial communication controller channels. This causes the selected serial communication controller channel to write the date concurrently on its address/data wires into the previously selected register if the operation is a write or to place the contents of the previously selected on its address/data wires if it is a read. The PAL holds the strobe signal for a time period for more than the required time and then deasserts it for write operations.

The serial communication controller chips inhibit the reassertion of a data strobe for about 2.5 microseconds after it is deasserted. The 68000 chip is fast enough for it to violate this requirement. The PAL is used to delay for this period of time before it starts looking for a signal to start another cycle to compensate for the fast operation of the 68000 chip. This removes the burden of detailed timing calculations for the programmer.

Some of the interrupt circuitry of the 8030 chips use the address strobe input as a clock. As a result, the PAL asserts this signal roughly once a microsecond while it is waiting for a cycle that references the chip.

The clock signal used by the serial communication controller chips is 3.6864 MHz. This makes it possible for the internal baud-rate generator to support data rates as high as 38400 baud with no additional circuitry.

A parallel interface and timer logic section can be combined in the operation of a commercially available component such as the Motorola 68230 parallel interface/timer (PIT). The IGS uses three 68230 units. These units function as follows. A PIT0 is used to communicate with the communication logic and for several miscellaneous functions. A PIT1 is used to communicate with the PCL, and a PIT2 is used to control image generation hardware. The PIT is a complex LSI component designed to work with 68000 family components in contrast to the serial communication controller chips. Accordingly, no extra components are required to connect the 68230 units to the 68000 chips besides the address decoding circuitry and a pullup resistor.

The floppy disk interface logic is part of an LSI component such as Western Digital 2797 floppy disk controller. This LSI component also includes the read data separator and write precompensation circuitry.

The 2797 chip is not designed to operate with 68000 family components so additional circuitry is utilized to obtain compatibility. All floppy disk drive signals are buffered by either a 74LS240 or a 74LS244 chip. The head load signal is not connected to the disk drive because read/and write head of the drive is loaded automatically whenever the disk is spinning.

The direct memory access logic includes a single Motorola 68440 direct memory access controller for the data transfer between the RAM of the 68000 chip and the parallel or serial interface or the flopping disk controller. The 68440 DMA controller has two independent DMA channels and is compatible with 68000 family components.

The interface to the image generation logic includes registered PAL's and some latches. This circuitry treats read and write requests to the bit-map RAM differently. In each case, the PAL waits for the currently 68000 cycle if any in the bit-map RAM to finish. When it has, the PAL asserts a signal to the control logic of the bit-map RAM and latches the 68000 data bits.

If the cycle is a write, the PAL sends a signal to the 68000 chip to indicate that enough information has been latched for the write operation to proceed to completion while the 68000 chip continues with other operations. The PAL asserts this signal for two clock states until the requested bit-map RAM write cycle has started. At this point during the write cycle the RAM returns to its idle to wait for a new request.

If the cycle is a read, the PAL does not send the signal to the 68000 chip but continues to assert a request until the bit-map RAM read cycle has begun. The PAL waits for the cycle to proceed far enough so that data is available. At this point it transmits the signal to the 68000 chip indicating that there is enough information for 68000 chip to proceed with other operations.

The IGS also includes image generation logic which can be generally divided into five units: the data path, the address path, the control logic, the RAM components themselves, and the print engine interface logic.

The data path from the 68000 chip to the bit-map RAM and back is 16 bits wide and includes a register to latch the data from the 68000 chip, a barrel shifter, an ALU, the bit-map RAM's, and a transparent latch to hold data while the 68000 chip reads them. The clock for the input register is associated with the bit-map interface circuit. This clock signal latches data for read and write references to the bit-map RAM. The input of this register comes from the 68000 data bus and the output is connected to input of the barrel shifter.

The barrel shifter has 16 bit input and output pads and is implemented with 825S10 or 74F350 chips. The output is shifted a number of places determined by the PIT2. The output of the barrel shifter is connected to inputs of a 16 bit ALU implemented with four 74LS181 units.

The output bits of the bit-map RAM also go to the inputs of the transparent latch made up of two 74LS373 units. This latch saves the output of the bit-map RAM's at the end of each 68000 cycle whether a read or a write cycle. Of course, only data saved during a read cycle is of interest. The outputs of this latch are enabled onto the 68000 data bus only during a read of the bit-map RAM.

The output of the bit-map RAM are also connected to the inputs of two 16-bit parallel input serial output shift registers. This portion of the circuitry forms a part of the print engine interface.

The address path circuitry includes logic to take the bit-map RAM addresses generated by the 68000 chip and by the print engine interface, manipulate them as described below, and pass the modified addresses onto the bit-map RAM's themselves. Both the address from the 68000 chip and the address from the print address generator logic are 19 bits in length. This is large enough to address the full half-million 16-bit words in the bit-map RAM.

Bits 1-19 of the 68000 address are latched in transparent latch including three 74LS373 units. The latch is normally in a flow-through condition. When the 68000 chip makes a reference to the bit-map RAM, a registered PAL described herein in the discussion of the interface to the image generation logic generates a signal that in turn causes another signal to be asserted. As long as either of these signals is asserted, the transparent latches hold their current value. The registered PAL deasserts the first signal when the second signal is asserted. Because of the nature of the synchronous circuit that generates the first signal, there is at least 100 nanoseconds between the time the second signal is asserted and when the first signal is deasserted.

The 68000 chip address lines connected to the transparent latch are permuted to simplify the image generation in the bit-map RAM. The 19 bits from the print address generator are also latched in a transparent latch including three 74LS373 units. The latch is normally in a flow-through condition. When a signal is asserted, the latches hold the current input value. This signal stays asserted during the entire bit-map RAM cycle that fetches data to be sent to the writing head.

Each of the two transparent latches in the address path circuitry is divided into three pieces corresponding to the three chips that make up each latch. The high-order three bits of both latches are driven onto three shared lines. Each latch is active during the entire cycle for which it holds the three address bits. Bits 2-9 of the 68000 address are connected to the latch holding a row address for the bit-map RAM. Bits 13-19 and 1 are connected to the latch holding a column address. Bits 0-7 of the print are connected to another latch holding a row address and bit 8-15 of the print address are connected to the second latch holding column address for the bits-map RAM. Outputs of these latches and the output of the fifth latch holding the refresh address for the bit-map RAM, share the 8-bit bus.

The multiplexing that forms the row and column address for the RAM is done by enabling the tri-state latch chips holding the data at the appropriate time. The cycle begins with the chip holding the address bits to be used as the row address for the current cycle, driving its contents onto the eight-bit shared bus.

In the 68000 cycle, the portion holding the 68000 row address for the RAM is enabled. In a print cycle or refresh cycle the chip holding the row address derived from the print address or refresh address is enabled, respectively. The column address is driven onto the shared bus in a similar way later in the bit-map RAM cycle. The shared bus is connected to the A inputs of an eight-bit adder implemented with two 74LS283 units. A signal is wired to the carry in of the low-order adder chip. When this signal is not asserted (low) the adder passes its input to its output and when the signal is asserted (high) the output of the adder is one plus the input. The signal is the output of an inverter whose input is the output of the control PAL. The signal is asserted by the bit-map RAM control PAL during a 68000 write to the bit-map RAM to access the susequent memory word in the same write cycle. Another signal is also asserted at the end of the bit-map RAM refresh cycle to generate the next refresh address.

The output of the adder is connected to the inputs of two octal buffers (2966 units) and to the bit-map RAM refresh address latch. The buffers are used to drive the address inputs of the dybnamic RAMs. Two are used because the capacitive load presented by the address inputs of 112 64K RAMs is too much for one chip to drive. The outputs of these buffers pass through intrnal series termination resistors to limit the undershoot on signals connected to the dynamic RAMs.

The eight-bit multiplexed address path described above applies to 64K dynamic RAM's. It is also possible to use 256K RAM's, but they require a nine-bit multiplexed address path. A few additional components are used to implement the extra bit.

The multiplexing is done with simple gates. Like the other address bits, the output of the discrete multiplexer is connected to two buffers. The outputs of these buffers go through series termination resistors and then to the RAM array.

There are two parts of the control logic. One associated with the bit-map RAM cycle control, the other one with a print address generation and the print engine interface control.

The time base for the control logic and CRT controller is provided by a crystal oscillator that produces a frequency two times the required bit transfer rate (BIT RATE*2). The output of the oscillator is divided by two by a 74LS74 flip-flop. The resulting signal is then fed to the enable inputs of a 74LS163 binary counter clocked with the BIT RATE*2 signal. The outputs of the synchronous counter are square waves with a frequency of the bit rate divided by 2, 4, 8 and 16.

68000 bit-map RAM cycle requests and print bit-map RAM cycle requests are asynchronous. There is no way of delaying a print bit-map RAM cycle so the 68000 chip accesses to the BM RAM have to be synchronized to print BM RAM cycles. The control PAL accepta a 68000 request for BM RAM cycle only outside the time window reserved for print a BM RAM access.

The same PAL will not grant a refresh cycle request for the bit-map RAM if an image transfer is in progress. Arbitration of BM RAM access and the initiation of bit-map RAM cycles are performed by a registered PAL.

The refresh cycle is the simplest one. When a refresh cycle is granted, a signal clears the refresh request and enables the row refresh address to the bit-map RAM. The refresh address is held in the refresh address latch (74LS374) mentioned in the bit-map address path discussion. One BIT RATE*2 cycle later two registered PALs assert RAS signals for all bit-map RAM chips. A cycle later the refresh address is increased by one by a signal and in the next cycle the negated signal latches the new refresh address in the address latch. The refresh cycle is now terminated and the arbitration PAL returns to its idle state.

The request for a print bit-map RAM cycle is synchronized to the CRT controller clock and it is issued only when the image transfer has been initiated. Because each address generated by the CRT controller refers to a 16-bit word in the bit-map RAM, the BIT RATE/16 signal is used as the CRTC clock. When CRTC asserts the signal, indicating that the CRTC has issued a valid image address, the rising edge of the BIT RATE/16 signal causes generation of the request for a print bit-map RAM cycle. The term "CRT" is used because the scan reading is analogous to scan reading for a CRT display.

When a print BM RAM access is granted a signal is asserted by the arbitration PAL. This signal remains asserted for the entire memory cycle. The signal latches the print address provided by the CRT controller in the print address latches and enables the outputs of the row address latch. One BIT RATE*2 cycle later the RAS PALs assert RAS signals to the bit-map RAM. A cycle later outputs of the row address latch are disabled and outputs of the column address latch are enabled by a signal asserted by the control PAL. One cycle later the signals for the bit-map RAM are asserted and remain in this state for the next two BIT RATE*2 cycles. These signals are decoded by the 74S138 three-to-eight decoder from the upper address bits <16:18> of the print address. These signals select one of the seven rows of the 64K RAM chips or one or the two rows of the 256K RAM chips. If 256k RAM chips are used, inputs A and B of the decoder have to be grounded instead of being connected to the address lines A16 and A17. Before the memory cycle is terminated (LP CYCLE L negated), the data read from the bit-map RAM cell has to be loaded into the shift registers in the printer engine interface.

If bit-map RAM is to be modified after its contents are transferred to the printer writing head, the control PAL asserts a signal that enables outputs of two bipolar PROMS (27S28 or 27S29), that assert write unable signals. Assertion of the write enable causes the data on the ALU outputs to be written into a just accessed bit-map RAM cell. The BM WE signals remain asserted for one BIT RATE*2 clock cycle. The print bit-map RAM cycle is then terminated and the arbitration PAL returns to its idle state.

The printer engine operates with the bits representing the image to be sent four bits at a time. The bits represent left even, left odd, right even and right odd dots. Even and odd bits of the word read from the bit-map RAM are loaded into separate eight-bit shift registers (74LS166) that compose the sixteen-bit shift register described in the previous section. As was mentioned before, one sixteen-bit shift register holds a word from the left half of the scan line, the second one a word from the right half of the scan line.

FIG. 3 shows a block diagram of the image generation system. A 68000 chip 50 for carrying out conventional functions as in the case of a conventional microprocessor. The 68000 chip 50 is connected to data bus 51. A ROM 52 has 64K bytes. The associated RAM 54 has 256K bytes, 512K bytes and 1M bytes. While not necessarily part of the image generation system, an optional diagnostic port and associated equipment 53 can be used.

A floppy disc controller (FDC) 56 can be inputed using a 5¼ inch diskette. A 1.2M byte format is used. Direct memory access controller (DMAC) 58 provides data transfer between the FDC 56 and the RAM 54. Serial communication controller (SCC) 60 provides a serial link to the printer control electronics and an optional connection to the communications logic. Also interfacing with the SCC 60 is a printer control logic which does not form a part of the image generation system. The SCC 60 also acts as an interface to other equipment.

Bit-map RAM 62 stores information for the bit-map transformations. Address gate array 64 provides a buffer storage and rearrangement of bit-map data. Bit-map control 66 provides control functions and data gate array 68 enables a scan-out of bit-map logic both forward and backward as needed for dual printing as well as a customized support for LED's in LED head 70.

While the invention has been described by reference to specific embodiments, this was for purposes of illustration only and should not be construed to limit the spirit or the scope of the invention.

I claim:

1. An image generation system for controlling a printer engine capable of simplex and duplex printing on a sheet of recording medium, comprising
   a bit-map for storing data to be printed on said sheet,
   means for receiving format selection signals indicating whether simplex or duplex printing is selected,
   means responsive to said format selection signals for causing said data to be read from said bit map in an order determined by whether simplex or duplex printing is selected, so that a first side of said sheet is printed from top to bottom and a second side of said sheet is printed from bottom to top when duplex printing is selected, and
   means for transmitting said data from said bit-map to said printer engine,
   wherein said printer engine includes means for printing a first side of said sheet from top to bottom and a second side of said sheet from bottom to top when duplex printing is selected, wherein said means responsive to said format selection signals includes an address gate array in electrical communication with said bit map for addressing said data stored in said bit map in accordance with whether simplex or duplex printing is selected, and wherein said transmitting means includes a data gate array in electrical communication with said print engine and said bit map, said data gate array operating in conjunction with said address gate array for transmitting data from said bit map to said print engine.

* * * * *